(12) United States Patent
Salvino et al.

(10) Patent No.: US 12,410,709 B1
(45) Date of Patent: Sep. 9, 2025

(54) COMPOUND PARABOLIC CONCENTRATOR ARRANGEMENT

(71) Applicants: Chris Salvino, Scottsdale, AZ (US); Drew F DeJarnette, San Diego, CA (US); Paul A Beatty, Fort Collins, CO (US)

(72) Inventors: Chris Salvino, Scottsdale, AZ (US); Drew F DeJarnette, San Diego, CA (US); Paul A Beatty, Fort Collins, CO (US)

(73) Assignee: LUNAR HELIUM-3 MINING, LLC, Scottsdale, AZ (US)

( * ) Notice: Subject to any disclaimer, the term of this patent is extended or adjusted under 35 U.S.C. 154(b) by 18 days.

(21) Appl. No.: 18/798,615

(22) Filed: Aug. 8, 2024

(51) Int. Cl.
| | |
|---|---|
| *E21C 51/00* | (2006.01) |
| *B64G 1/16* | (2006.01) |
| *F24S 23/00* | (2018.01) |
| *F24S 23/70* | (2018.01) |
| *F24S 23/71* | (2018.01) |
| *F24S 40/55* | (2018.01) |

(52) U.S. Cl.
CPC .............. *E21C 51/00* (2013.01); *B64G 1/16* (2013.01); *F24S 23/12* (2018.05); *F24S 23/71* (2018.05); *F24S 40/55* (2018.05); *F24S 2023/87* (2018.05)

(58) Field of Classification Search
CPC .. B10D 7/02; E21C 51/00; F24S 23/71; F24S 23/12; F24S 40/55
USPC ................ 126/684–685, 688–690, 568–713
See application file for complete search history.

(56) References Cited

U.S. PATENT DOCUMENTS

| | | | |
|---|---|---|---|
| 4,026,267 A * | 5/1977 | Coleman | F24S 23/30 136/246 |
| RE31,678 E * | 9/1984 | Ochiai | H01L 31/0547 385/115 |
| 5,168,158 A | 12/1992 | McComas et al. | |
| 7,514,694 B2 | 4/2009 | Stephan et al. | |
| 7,919,758 B2 | 4/2011 | Stephan et al. | |
| 8,330,115 B2 | 12/2012 | Frank | |
| 9,134,047 B2 | 9/2015 | Black et al. | |
| 9,261,468 B2 | 2/2016 | Bingham et al. | |
| 9,599,729 B2 | 3/2017 | Roscoe et al. | |
| 10,222,121 B2 | 3/2019 | Cullinane et al. | |
| 11,624,542 B2 | 4/2023 | Sung | |
| 2013/0034198 A1 | 2/2013 | Chandrasekharan et al. | |

(Continued)

OTHER PUBLICATIONS

Rice, Development of Lunar Ice/Hydrogen Recovery System Architecture, Jan. 1, 2000, p. 36, NIAC, Madison, WI.

*Primary Examiner* — Vivek K Shirsat
(74) *Attorney, Agent, or Firm* — Kenneth Altshuler

(57) ABSTRACT

Described herein are embodiments directed to collecting vaporize gas via a CPC arrangement. The CPC arrangement generally comprises a transporter that carries around a cover with one or more cryogenically cooled plates (or some other cryogenically cooled surface) therein. A plurality of CPCs dispersed on the transporter each have a concave reflective bowl that captures and directs sunlight through a fiberoptic cable where the sunlight is focused on regolith in an internal environment defined within the cover when resting atop the regolith. The focused sunlight heats the regolith and liberates the gas from the regolith, which is trapped in the internal environment. The gas in the internal environment condenses on the cooled plates where it can be collected and processed.

18 Claims, 14 Drawing Sheets

(56) References Cited

U.S. PATENT DOCUMENTS

2022/0090500 A1\* 3/2022 Sercel ................. B64G 1/66
2023/0411134 A1  9/2023 Ryan et al.
2024/0035379 A1  2/2024 Grillos \* cited by examiner

COMPOUND PARABOLIC CONCENTRATOR ARRANGEMENT

CROSS-REFERENCE TO RELATED APPLICATIONS

None.

BACKGROUND OF THE INVENTION

1. Field of the Invention

The present invention relates generally to mining extraterrestrial sites for gas trapped in extraterrestrial soil.

2. Description of Related Art

Helium-3 (He-3) holds immense potential as a clean and efficient energy source, offering numerous benefits for various applications. It has been discovered that He-3 is a highly efficient fuel for nuclear fusion, which has the potential to provide a nearly limitless and environmentally friendly energy solution. When He-3 fuses with deuterium, it produces a helium atom, a proton, and a tremendous amount of energy. Unlike traditional nuclear fission, fusion reactions release energy without generating hazardous radioactive waste or greenhouse gas emissions. Harnessing He-3 for fusion could revolutionize the energy landscape, providing a stable and sustainable source of power for the future.

However, despite its remarkable benefits, mining He-3 on Earth faces significant limitations. For one thing, He-3 is incredibly scarce on our planet. It is primarily found in minute quantities in the top surfaces of lunar soil, known as regolith, and is sparsely present in the Earth's atmosphere. Consequently, the extraction of He-3, whether on Earth or the Moon, is challenging and expensive. Moreover, mining it on the Moon poses logistical difficulties requiring advanced technologies and significant investments. Even assuming mining on the Moon is successful, transporting the mined He-3 from the Moon to Earth presents significant technical challenges and high costs. These limitations highlight the need for further research and development to find more accessible and cost-effective sources of He-3 or to explore alternative fusion fuel options that do not rely solely on He-3.

The subject matter disclosed herein is generally directed to innovations related to collecting He-3 and other useable gaseous elements on extra-terrestrial bodies.

SUMMARY OF THE INVENTION

The present invention generally relates to mining extraterrestrial sites for gas trapped in extraterrestrial soil.

In that light, certain embodiments of the present invention envision a CPC heating arrangement that generally comprises a transporter that carries a plurality of CPCs that are equipped to heat granular soil to mine target gases trapped in the granular soil. More specifically, the transporter comprises a transporter body defining a top end and a bottom end, wherein the bottom end is configured to interface a surface of an extra-terrestrial body. The transporter is configured to be moved in different locations on the extraterrestrial body, such as the moon. The CPC arrangement further comprises a cover having an internal cover volume, which is a volume within the cover defined from between a cover rim and an inside cover top of the cover. The internal cover volume defines a shielded environment when the cover rim rests atop granular soil. The shielded environment is the internal volume of the cover and is only in communication with an outside environment via the cover rim when the cover rim is not resting atop the granular soil. Resting atop means in contact with the granular soil wherein there are essentially no gaps between the granular soil surface and the cover rim. Resting can be wherein at least a portion of the weight of the cover is supported by the granular soil or if the cover is pressed into the granular soil via a motorized actuator connected to the transporter. The plurality of CPCs extends from the top end, such as an array on an armature or frame. Each CPC comprises a concave reflective bowl having a refractive index of at least 1.4. Each of the concave reflective bowls are defined between a bowl rim and a bowl apex, wherein the bowl rim is configured to confront the sun and the bowl apex is configured to receive sunlight from the concave reflective bowl. Each of the concave reflective bowls further comprises a fiberoptic cable extending from a fiberoptic inlet end connected to the bowl apex to a fiberoptic outlet end located in the internal volume. The fiberoptic outlet end is configured to reside within 6 inches from the granular soil. The sunlight is configured to be received at the fiberoptic inlet end and emitted at the fiberoptic outlet end.

Another embodiment of the present invention contemplates a CPC arrangement generally comprising a transporter, an internal cover volume and a cryogenically cooled surface. The transporter supports a plurality of CPCs each configured to receive sunlight. Each CPC comprises a concave reflective bowl defined between a bowl rim and a bowl apex comprising a bowl aperture and a fiberoptic cable extending from a fiberoptic inlet end at the apex to a fiberoptic outlet end. The fiberoptic outlet end is configured to emit the sunlight received at the fiberoptic inlet end from the bowl aperture on a granular surface. The CPC arrangement further comprises an internal cover volume defined within a cover that extends from an internal cover top to a cover rim. There is a cryogenically cooled surface within the internal cover volume, wherein the cryogenically cooled surface is configured to be cooled by cryogenic liquid. The fiberoptic outlet end extends into the internal cover volume.

Another embodiment of the present invention contemplates a CPC system that generally comprises a transporter that carries a plurality of CPCs that are equipped to heat regolith to mine target gases trapped in the regolith. More specifically, the transporter defines a top end and a bottom end with the bottom end being configured to interface regolith. The transporter configured to be moved in different locations on the moon. The CPC system further comprises a cover that defines a shielded environment when a cover rim of the cover rests atop the regolith. The shielded environment (or the internal cover volume when not in contact with the regolith) is only in communication with an outside environment via the cover rim when the cover does not rest atop the regolith. The plurality of CPCs extends from the top end, wherein each CPC comprises a concave parabolic reflective bowl. Each of the concave reflective bowls is defined between a bowl rim and a bowl apex, wherein the bowl rim is configured to receive sunlight. An aperture in the bowl apex is configured to receive the sunlight from the concave reflective bowl. A fiberoptic cable extends from a fiberoptic inlet end to a fiberoptic outlet end and connects to the bowl apex at the fiberoptic inlet end. The fiberoptic cable is in light communication with the aperture, meaning light moves through the aperture and into the fiberoptic cable. The fiberoptic outlet end is in the shielded environment and is configured to interface the regolith. The fiberoptic cable is configured to transmit the sunlight from the fiberoptic inlet end through the fiberoptic outlet end.

Certain other embodiments of the present invention envision a CPC and gas collection arrangement that generally comprises a transporter that carries a plurality of CPCs that are equipped to heat granular soil to mine target gases trapped in the granular soil. More specifically, the transporter is configured to be moved in different locations on the moon. The arrangement further comprises a cover that defines a shielded environment when a cover rim of the cover rests atop the regolith. The shielded environment is not in communication with an outside environment. Each of the plurality of CPCs comprises a concave parabolic reflective bowl defined between a bowl rim and a bowl apex. The bowl rim is configured to receive sunlight and direct the sunlight to the aperture at the bowl apex.

DETAILED DESCRIPTION

Figure 1A:
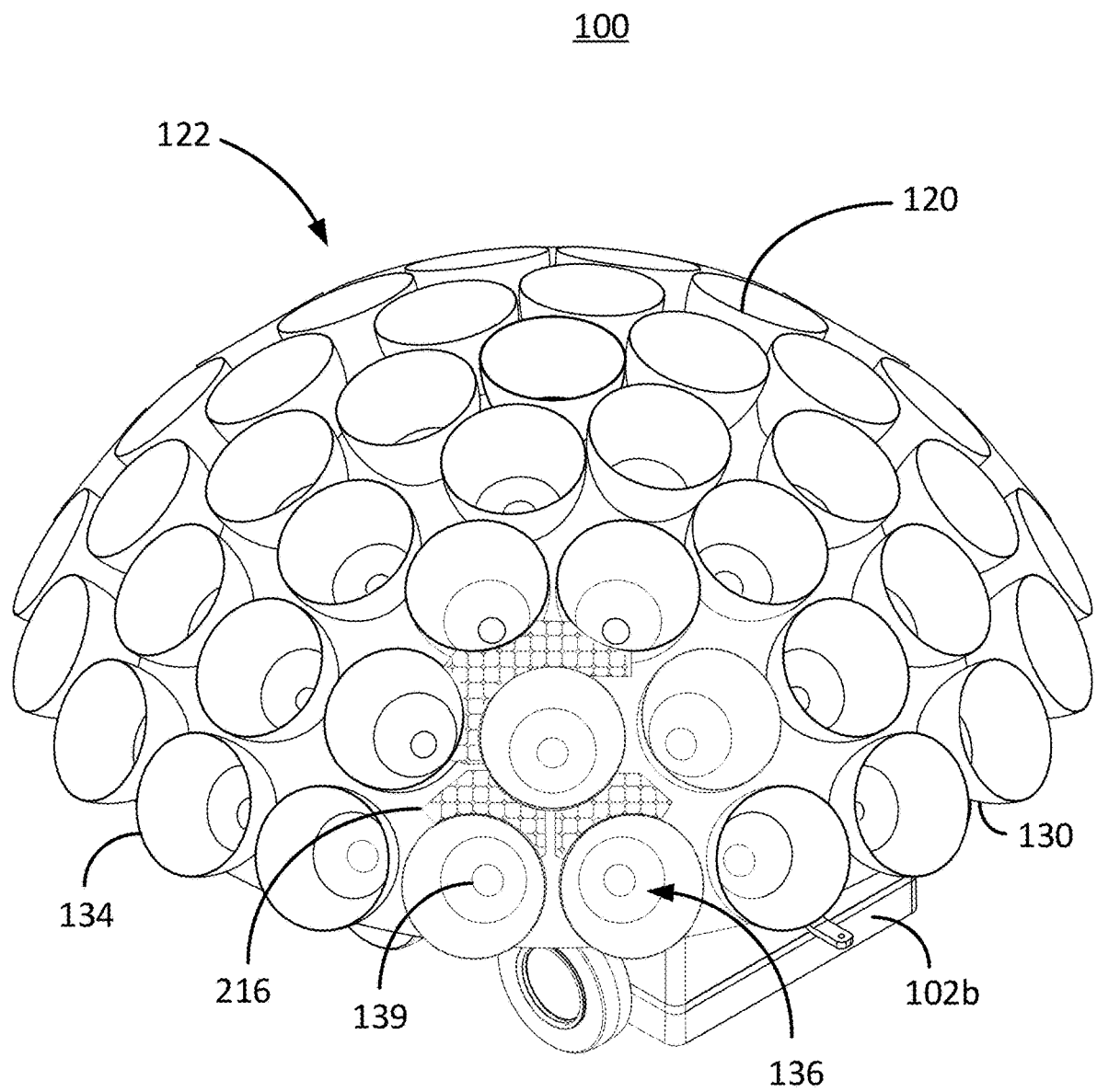
FIGS. 1A-1D are line drawings of a compound parabolic concentrator and gas collection arrangement constructed in accordance with embodiments of the present invention.

Initially, this disclosure is by way of example only, not by limitation. Thus, although the instrumentalities described herein are for the convenience of explanation, shown and described with respect to exemplary embodiments, it will be appreciated that the principles herein may be applied equally in other similar configurations involving the subject matter directed to the field of the invention. The phrases "in one embodiment", "according to one embodiment", and the like, generally mean the particular feature, structure, or characteristic following the phrase, is included in at least one embodiment of the present invention and may be included in more than one embodiment of the present invention. Importantly, such phases do not necessarily refer to the same embodiment. If the specification states a component or feature "may", "can", "could", or "might" be included or have a characteristic, that particular component or feature is not required to be included or have the characteristic. As used herein, the terms "having", "have", "including" and "include" are considered open language and are synonymous with the term "comprising". Furthermore, as used herein, the term "essentially" is meant to stress that a characteristic of something is to be interpreted within acceptable tolerance margins known to those skilled in the art in keeping with typical normal world tolerance, which is analogous with "more or less." For example, essentially flat, essentially straight, essentially on time, etc. all indicate that these characteristics are not capable of being perfect within the sense of their limits. Accordingly, if there is no specific +/− value assigned to "essentially", then assume essentially means to be within +/−2.5% of exact. The term "connected to" as used herein is to be interpreted as a first element physically linked or attached to a second element and not as a "means for attaching" as in a "means plus function". In fact, unless a term expressly uses "means for" followed by the gerund form of a verb, that term shall not be interpreted under 35 U.S.C. § 112 (f). In what follows, similar or identical structures may be identified using identical callouts.

With respect to the drawings, it is noted that the figures are not necessarily drawn to scale and are diagrammatic in nature to illustrate features of interest. Descriptive terminology such as, for example, upper/lower, top/bottom, horizontal/vertical, left/right and the like, may be adopted with respect to the various views or conventions provided in the figures as generally understood by an onlooker for purposes of enhancing the reader's understanding and is in no way intended to be limiting. All embodiments described herein are submitted to be operational irrespective of any overall physical orientation unless specifically described otherwise, such as elements that rely on gravity to operate, for example.

Described herein are embodiments directed to collecting gaseous atoms and molecules in an extremely low-pressure environment and collecting those gaseous atoms and molecules using cryogenically cooled surfaces, such as plates. Extremely low-pressure environment is defined herein as below $1 \times 10^{-5}$ bars, wherein pressure at sea-level on Earth is approximately 1 bar. Aspects of the present invention consider mining gaseous atoms and molecules on extraterrestrial bodies such as the Moon, asteroids, moons orbiting other planets, etc., for example. Many of these extraterrestrial bodies have little to no ambient pressure at or just beyond their surfaces and depending on the size of the extraterrestrial body have a significantly lower gravitational pull than that experienced on Earth.

Though embodiments of the present invention can be used in conjunction with many different extraterrestrial bodies, it is one object of the present invention to focus on mining gaseous atoms and molecules (materials) from the Moon. The Moon's atmosphere (the surface boundary exosphere) has a pressure of about $3 \times 10^{-15}$ bars and can range in temperature between 20° to 400° Kelvin. In the interest of continued exploration of the Moon as well as maintaining long-term residents on the Moon, extracting or otherwise mining important gaseous materials from the Moon, such as oxygen, nitrogen, hydrogen, and helium, for example, reduces the dependency of transporting such gaseous materials from the Earth. Moreover, helium-3 (He-3), a light stable isotope of helium having two protons and one neutron, which has promise as an important constituent in fusion reactions, is far more abundant on the Moon than the Earth. In some estimates, helium-3 is more than a thousand times more abundant on the Moon than compared to the Earth making the Moon a better target to obtain helium-3.

Certain embodiments of the present invention envision extracting target gaseous materials from the Moon by heating up moon regolith (lunar soil/minerals) to desorb valuable gas, such as He-3, that is bound to the regolith. Desorbing temperatures are defined as temperatures that are high enough to liberate/desorb (and possibly vaporize) these target gaseous materials from moon regolith, or simply "regolith". Desorbing temperatures may start around 600° C. The desorbed target gaseous materials such as He-3 are then collected as liquid from condensation surfaces that are at or below the condensation temperatures corresponding to each of the target gaseous materials. When condensed i.e., liquefied, the liquid or frozen, which improves the transportation of these target materials.

Presented below are embodiments directed to collecting gas via a CPC arrangement. The CPC arrangement generally comprises a transporter that carries around a cover with one or more cryogenically cooled condensation plates (or some other cryogenically cooled condensation surface) therein. A plurality of CPCs dispersed on the transporter each have a concave reflective bowl that captures and directs sunlight through a fiberoptic cable where the sunlight is focused on regolith in an internal environment defined within the cover when resting atop the regolith. The focused sunlight heats the regolith and liberates the gas from the regolith, which is trapped in the internal environment. The gas in the internal environment condenses on the cooled plates where it can be collected and processed.

Figure 1B:
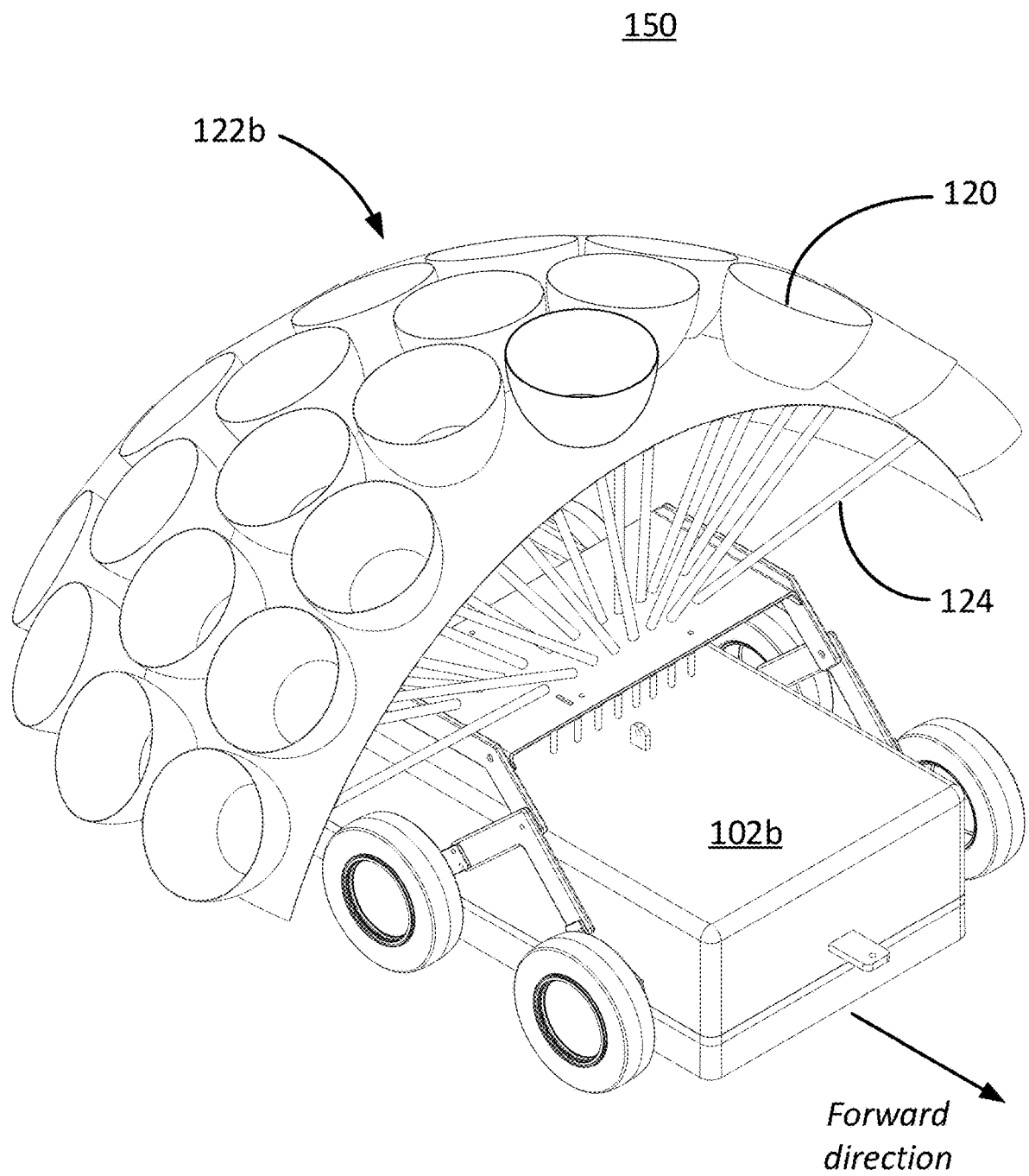
Figure 1C:
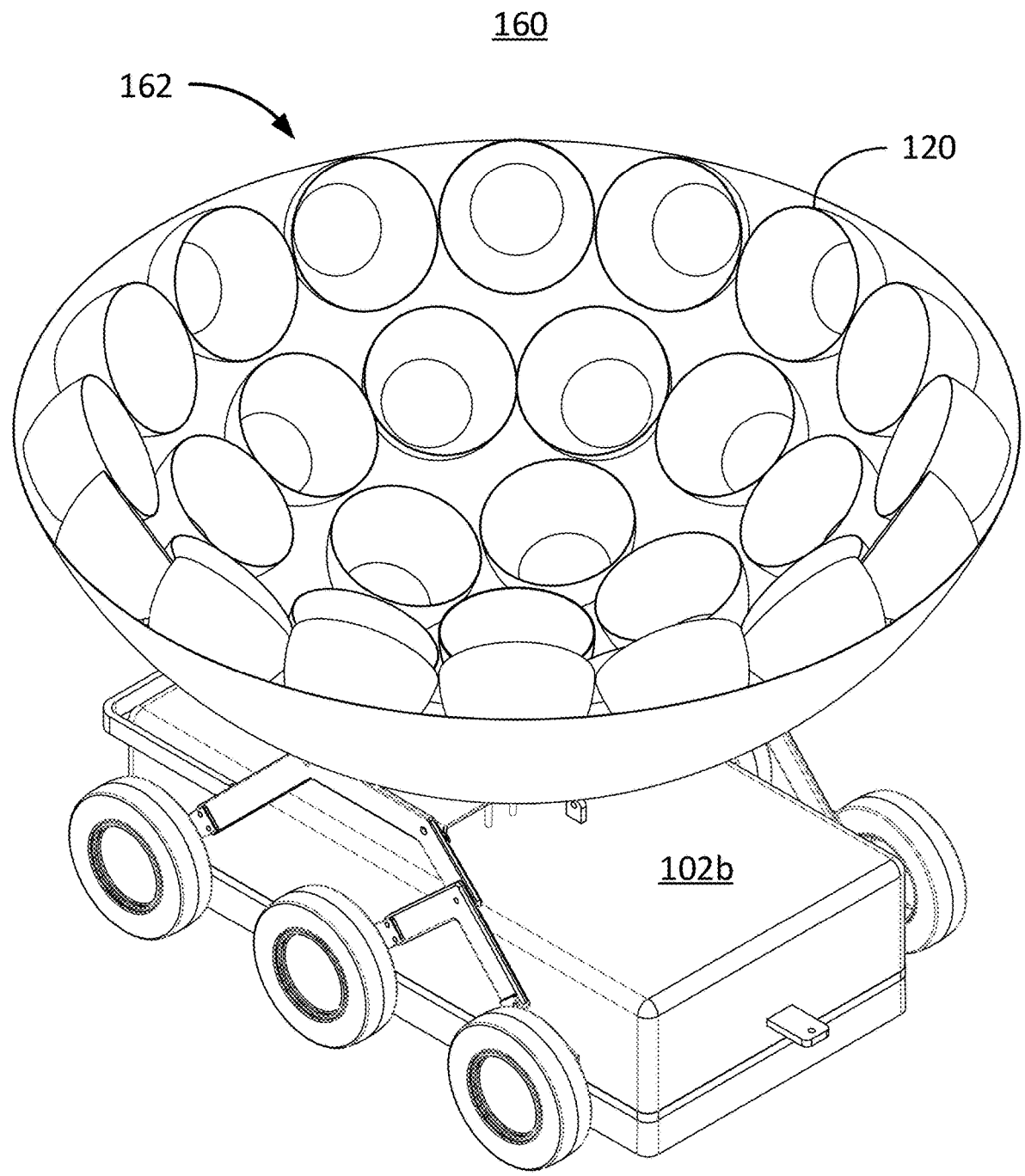
Figure 1D:
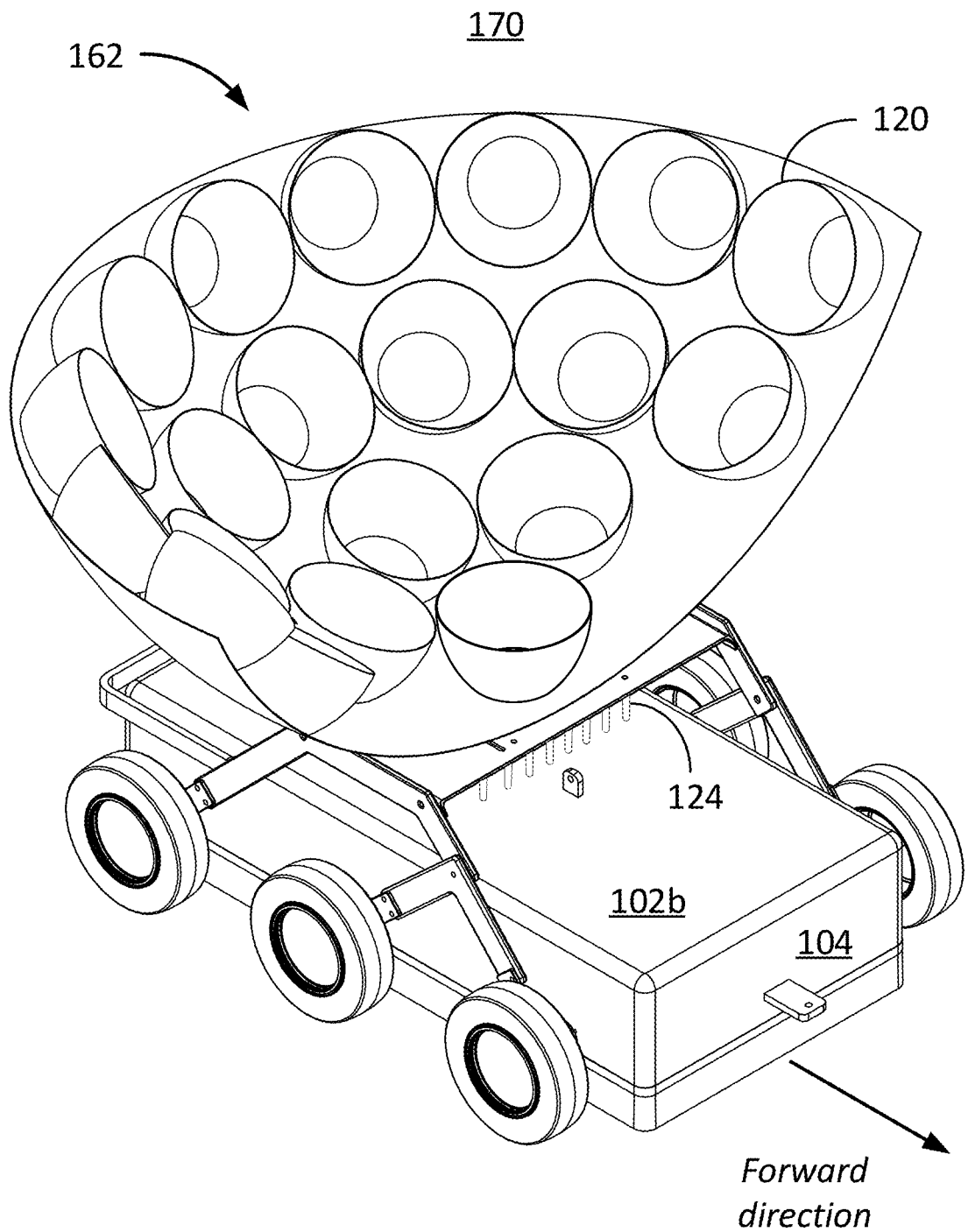

Referring to the drawings in general, FIGS. 1A-1D are line drawings of a compound parabolic concentrator and gas collection arrangement constructed in accordance with embodiments of the present invention. FIG. 1A is an isometric view of a compound parabolic concentrator and gas collection arrangement 100 depicting a full semi-spherical convex compound parabolic concentrator (CPC) array 122 disposed on a rover wagon 102b. Certain embodiments envision photo voltaic solar (PV) panels 216 being disposed in the spaces, or gaps, between the CPCs 120 to passively generate electricity for the transporter 102a. Though there are only three PV panels 216 shown here, there can be enough PV panels 216 to fit between all the outer bowl rims 134 of the CPCs 120. Each CPC 120 comprises a bowl aperture 139 at the bowl apex 136 in the bottom of the CPC bowl 130. The bowl apertures 139 are not depicted in the other figures for sake of simplicity but are nonetheless an integral part of the CPC 120. FIG. 1B is an isometric view of an optional CPC and gas collection arrangement 150 depicting a half semi-spherical convex CPC array 122b disposed on a rover wagon 102b. This further shows the fiberoptic cables 124 extending from the CPCs 120 into the wagon body 104 of the rover wagon 102b. FIG. 1C is an isometric view of yet another optional CPC and gas collection arrangement 160 depicting a full semi-spherical concave CPC array 162 disposed on a rover wagon 102b. FIG. 1D is an isometric view of still another optional CPC and gas collection arrangement 170 depicting a half semi-spherical concave CPC array 162b disposed on a rover wagon 102b with the fiberoptic cables 124 extending from the CPCs 120 into the body of the rover wagon 102b. The concepts of the embodiments of FIGS. 1A-1D are described with respect to forgoing embodiment.

Figure 2A:
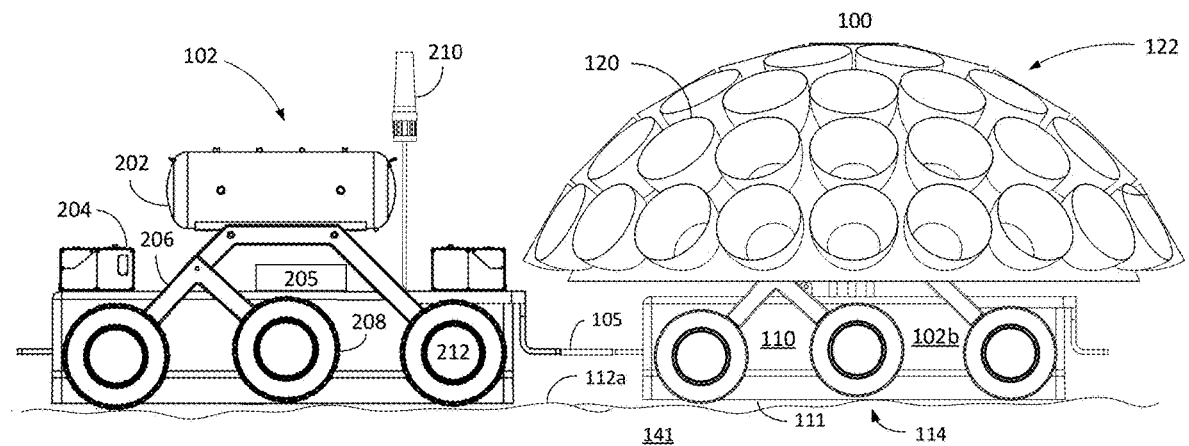
FIGS. 2A and 2B are line drawings of different perspectives of a rover pulling a wagon carrying a CPC and gas collection arrangement in accordance with embodiments of the present invention.
Figure 2B:
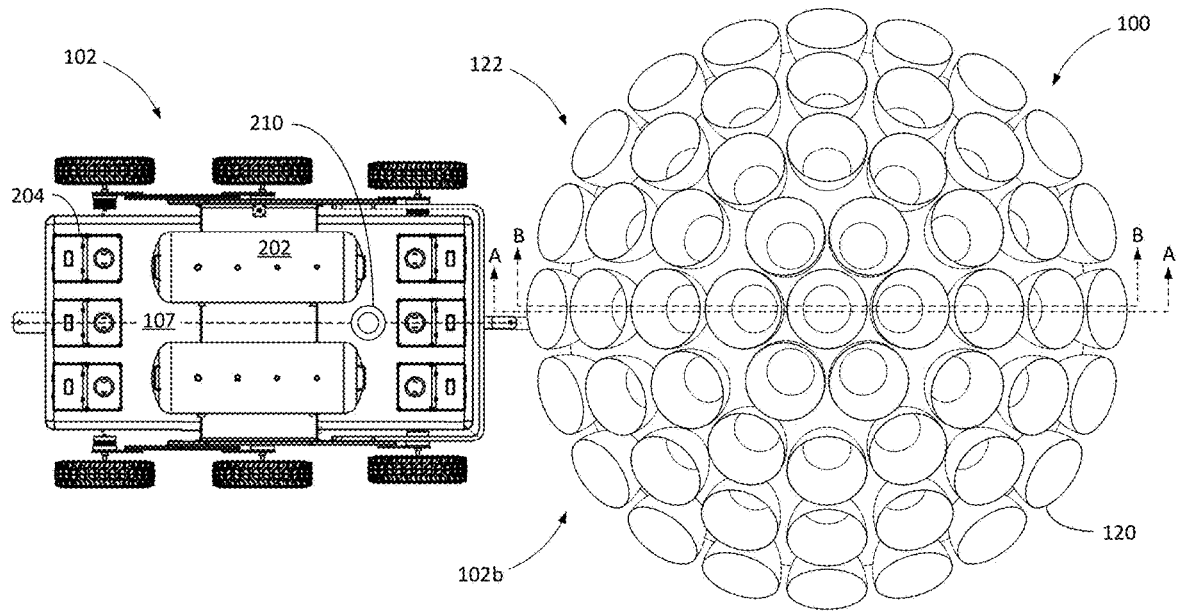

FIGS. 2A and 2B are line drawings of different perspectives of a rover 102 pulling a wagon 102b carrying a CPC and gas collection arrangement 100 in accordance with embodiments of the present invention. Though the wagon 102a is the transporter 102a supporting or otherwise carrying the CPC and gas collection arrangement 100, the transporter 102a can be a rover 102, a robot or human carried platform or some other support structure that is arranged to support CPCs 120 in a manner that accomplishes the tasks described herein.

FIG. 2A is a side view of the CPC and gas collection arrangement 100, depicting the rover 102 connected or otherwise linked to the wagon 102b via a hitch linkage 105. The CPC and gas collection arrangement 100 is depicted with the semi-spherical convex CPC array 122 mounted on the rover wagon 102b. Both the rover wagon 102b and the rover 102 comprise a cover rim 111 configured to essentially press (or somewhat seal) against the granular surface 112a (which when referring to the moon 141, is regolith surface) to form the shielded environment 114 inside of the cover 110. Some embodiments envision the rover 102 not comprising a shielded environment but rather used to simply pull one or more wagons 102b around the surface of the moon 141 or some other extra-terrestrial body. The shielded environment 114 is essentially the same volume as the internal volume of the cover 110 defined from the inside cover top 107c to the cover rim 111, which by convention will also have the callout 114.

With respect to the rover 102, general components can include supporting elements that provide all necessary power and functionality needed to operate the rover 102 and the wagon 102b. This includes cryogenic fluid tanks and pumping system 202, a battery system 204, communication system 210, computer system 205, etc. The cryogenic fluid tanks and pumping system 202 (as viewed in conjunction with FIG. 3A) can provide a cooling liquid to cool condensation plates 115 in the gas collection system 118. A cryogenic liquid pumping station 117, that can be connected to the cryogenic fluid tanks 202 via fluid carrying lines (not shown), circulates cryogenic fluid through conduits 119 either encased in/or lining the gas condensation plates 115. Gaseous atoms and molecules that are liberated from the regolith 112 (via heat, for example) condense on the cryogenically cooled gas condensing plates 115 inside of the shielded environment 114.

With continued attention to FIG. 2A, the rover 102 can comprise a battery system 204 that can include one or more batteries that can be rechargeable by photo-voltaic panels or some internal generator that uses fuel, or some combination thereof. The communications system 210 can be a wireless communicator that uses RF, laser, IR or some other wireless communications means understood by those skilled in the art. The computer system 205 generally includes a central processing unit, processors, volatile/transient and non-transient memory, etc., and can function within a computer area network contained within the rover 102 and CPC and gas collection arrangement 100. Electric driving motors 212 can be built into the wheel hubs to spin the wheels 208 (or tracks) that propel the rover 102 around the surface 112a. The suspension system 206 provides flexibility to the drivetrain to navigate over uneven terrain for the rover 102, and wagon 102b.

FIG. 2B is a top view line drawing of the rover 102 pulling the wagon 102b carrying the CPC and gas collection arrangement 100. The rover 102 presents the top surface 107 of the rover 102 calling out the cryogenic liquid tanks 202, batteries 204 and the communication system 210. The CPC and gas collection arrangement 100 is sectioned by two cross-section lines AA and BB through a plurality of CPCs 120 along the center of the wagon 102b.

Figure 3A:
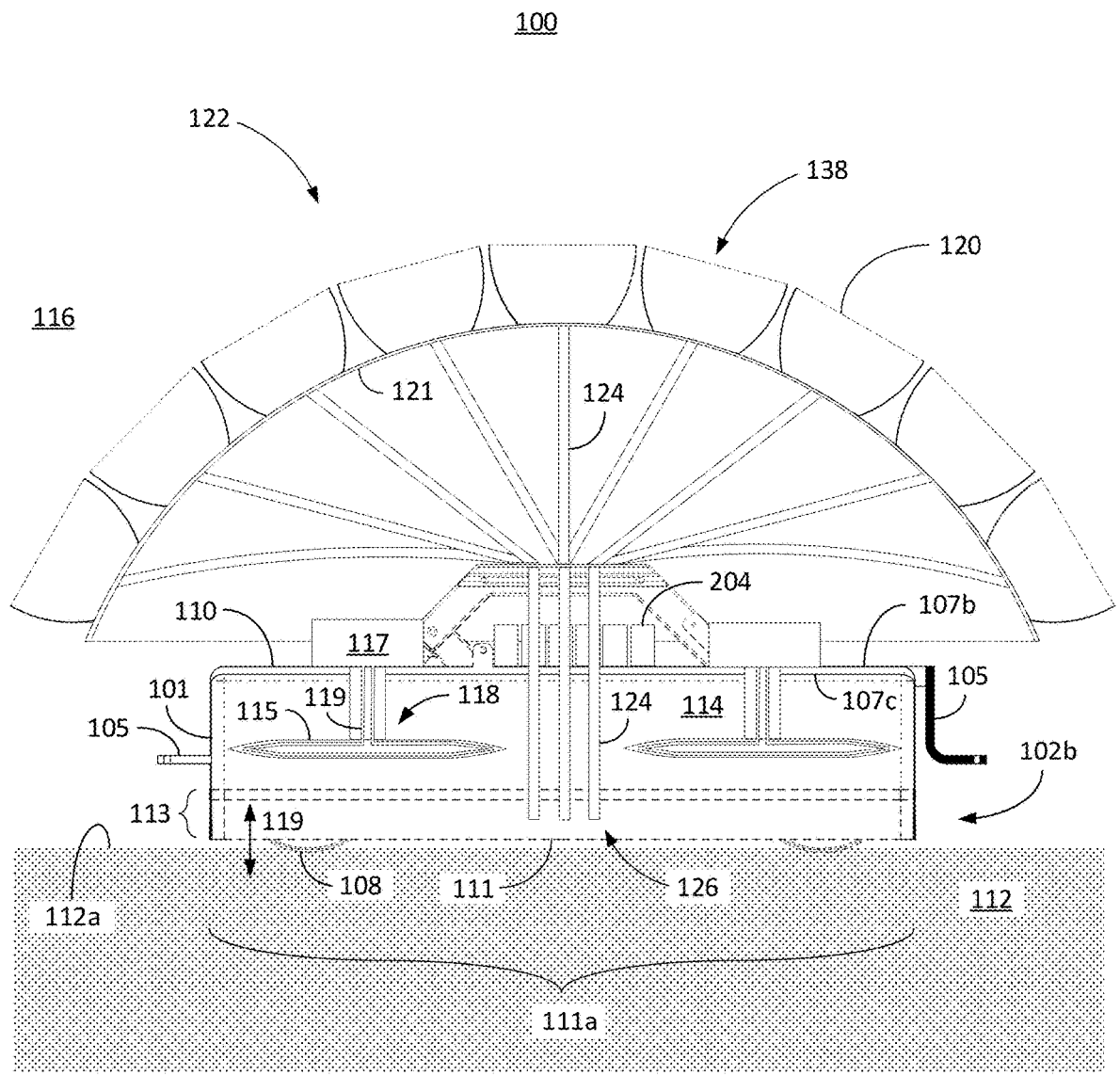
FIG. 3A is a line drawing of the CPC and gas collection arrangement of FIG. 1A between the cross-section lines AA and BB (of FIG. 2B) constructed in accordance with embodiments of the present invention.

FIG. 3A is a line drawing of the CPC and gas collection arrangement of FIG. 1A between the cross-section lines AA and BB (of FIG. 2B) constructed in accordance with embodiments of the present invention. As depicted, the CPC and gas collection arrangement 100 generally includes a transporter that supports a convex CPC array 122, which is configured to concentrate and direct solar energy as heat to granular soil 112 within the footprint 111a of a shielded environment 110. The dashed lines depict components of interest that are not between the cross-section lines AA and BB.

Figure 4A:
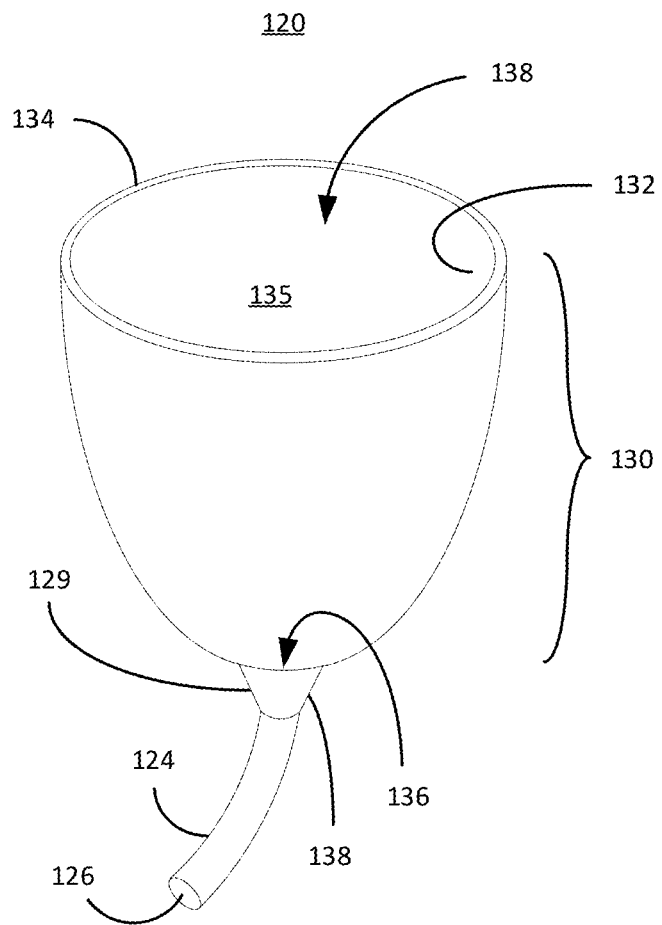
FIG. 4B is a line drawing of a CPC cross-section depicting soler energy concentration consistent with embodiments of the present invention.
FIG. 4C is a line drawing of a compound parabolic concentrator array cross-section in a convex arrangement consistent with embodiments of the present invention.
Figure 4B:
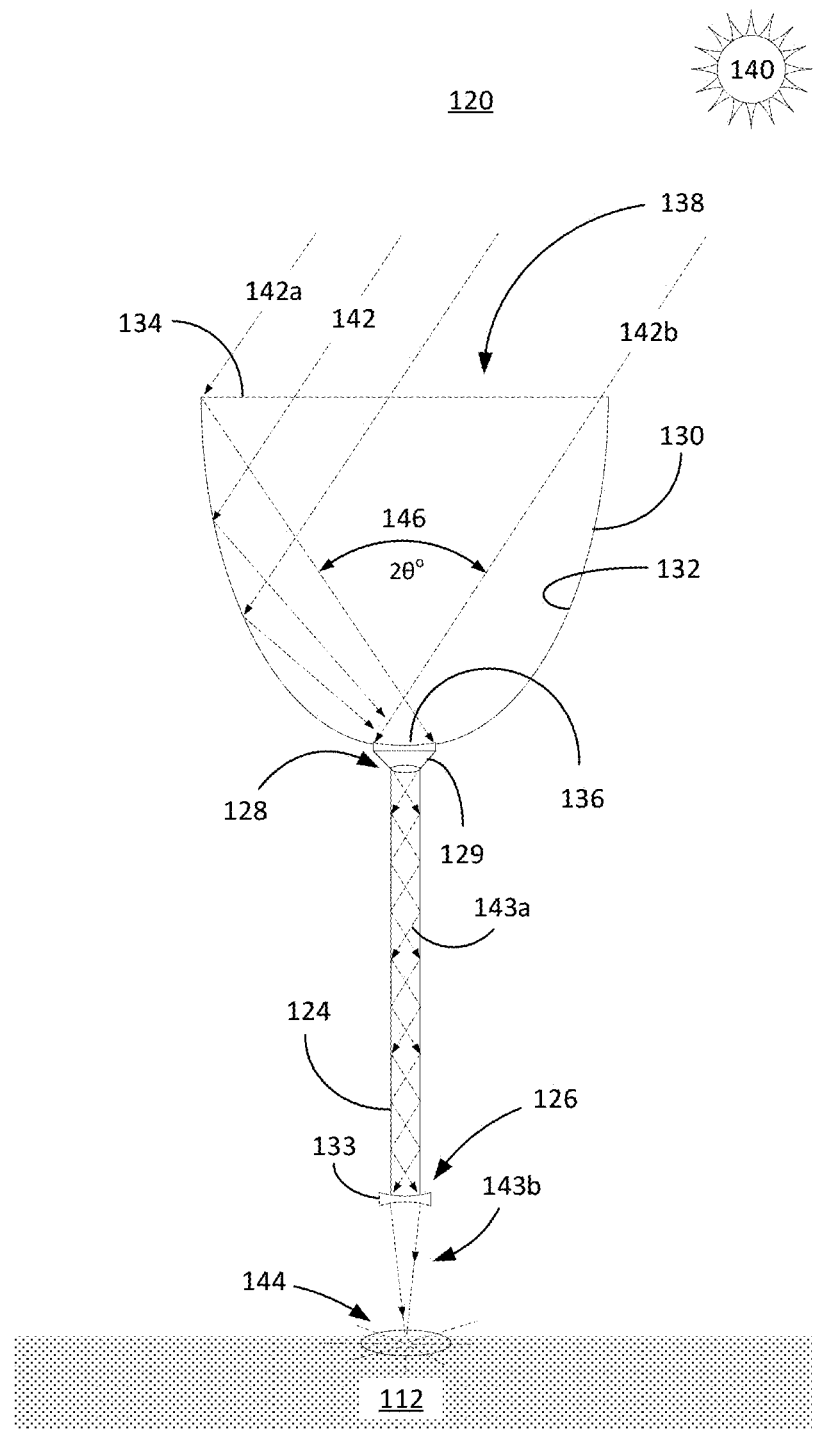
Figure 4C:
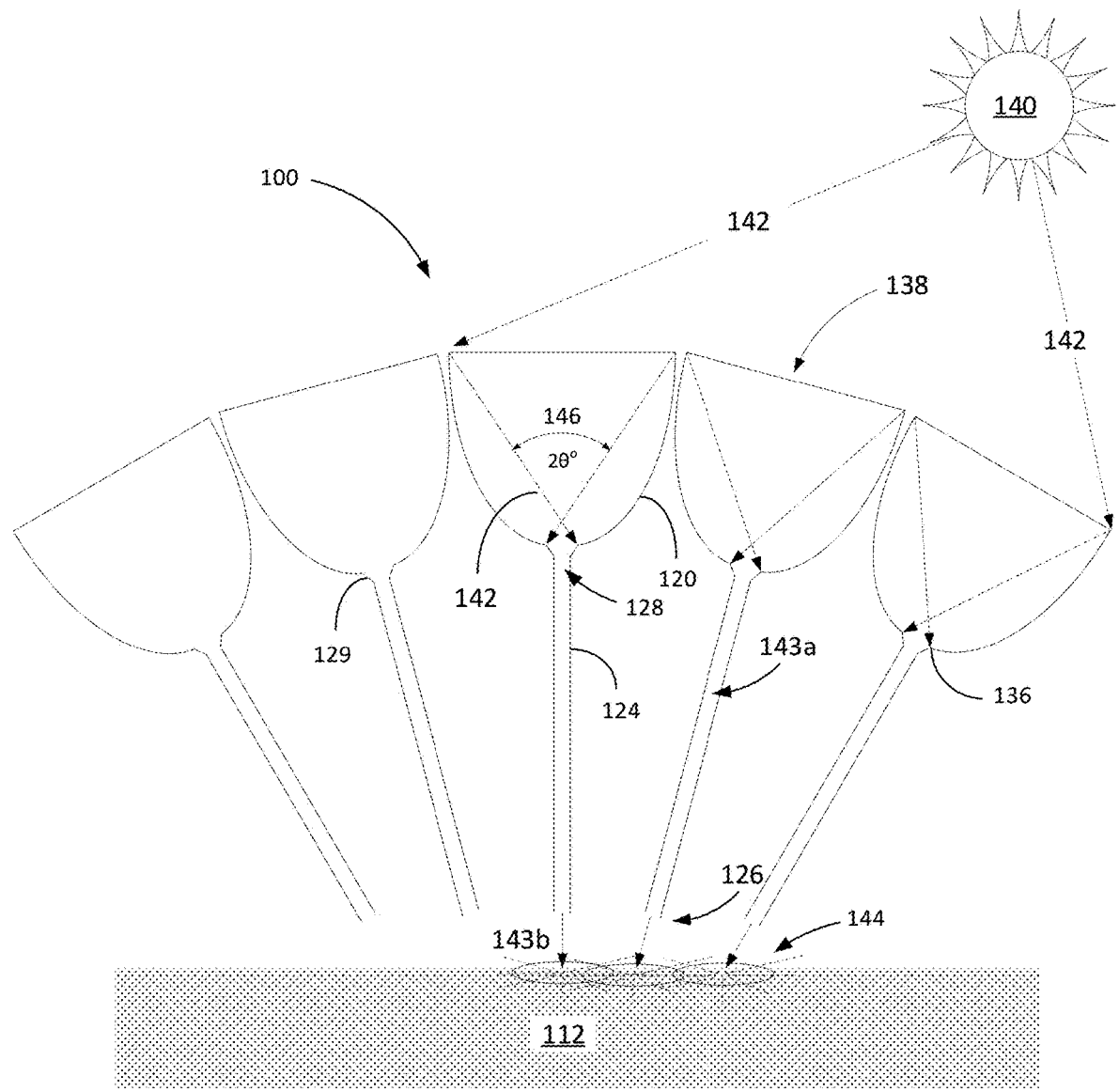

As viewed with respect to FIGS. 4B and 4C, the convex CPC array 122 comprises a plurality of CPCs 120 distributed in an arched/non-planar arrangement. The CPCs 120 can be disposed along a semi-spherical frame 121 that is an armature that supports the plurality of CPCs 120. Each CPC 120 is configured to capture solar energy 142 and direct the solar energy in a concentrated form 143a into an inlet end 128 of a fiberoptic light cable 124 (also known as a light pipe). The concentrated solar energy 143a is transferred through the fiberoptic cable 124 and emitted from the outlet end 126 of the fiberoptic cable 124 as a heat beam that is directed at the regolith 112. The outlet end 126 is disposed within the internal volume/shielded environment 114. The shielded environment 114 is defined by and within the cover 110 when resting atop the regolith 112, which happens to be essentially the same volume as the internal volume of the cover from the inside cover top 107c to the cover rim 111. In this embodiment, the cover 110 extends (via cover sides 101, in this configuration) from the inside of a cover top 107c towards the regolith surface 112a. In certain embodiments, the cover 110 can include a pliable or moveable skirt 113, which can actuate towards or away from the regolith surface 112a, as shown by the arrow 119. Here, the skirt 113 is at least somewhat retracted to allow clearance for the wagon 102b to roll over the regolith 112 (as shown by the wheels 108 partially revealed). In this embodiment the distal rim of the moveable skirt 113 serves as the cover rim 111. The cover rim 111 is configured to seal against the regolith surface 112a, thereby creating the shielded environment 114 within the cover 110. The cover rim 111 defines the footprint 111a of the shielded environment 114. The shielded environment 114 (internal volume) is only in communication with the outside environment 116 when the cover rim 111 is not in contact with the regolith surface 112a. Accordingly, a high heat light concentrated beam 143b from the concentrated solar energy 143a is emitted from each fiberoptic outlet ends 126 and directed to regolith 112. Gaseous elements trapped in the regolith 112 are liberated when temperatures exceed their liberation threshold, which for some elements and molecules is between 600° C.-1000° C. The liberated gaseous elements contained in the internal environment 114 can then be collected by gas collectors 115 inside of or at least in fluid communication with the internal environment 114 (i.e., in a separate container having an environment that can receive the gases from the internal environment 114).

In this embodiment, the wagon 102b supports the cryogenic liquid pumping station 117 and batteries 204, which are bolted or otherwise attached to the wagon's top surface 107b. The cryogenic liquid pumping station 117 circulates cryogenic fluid (received from the cryogenic liquid tanks 202 on the rover 102) through the liquid cryogen carrying conduits 119, which in this embodiment run through the gas condensation plates 115.

Figure 3B:
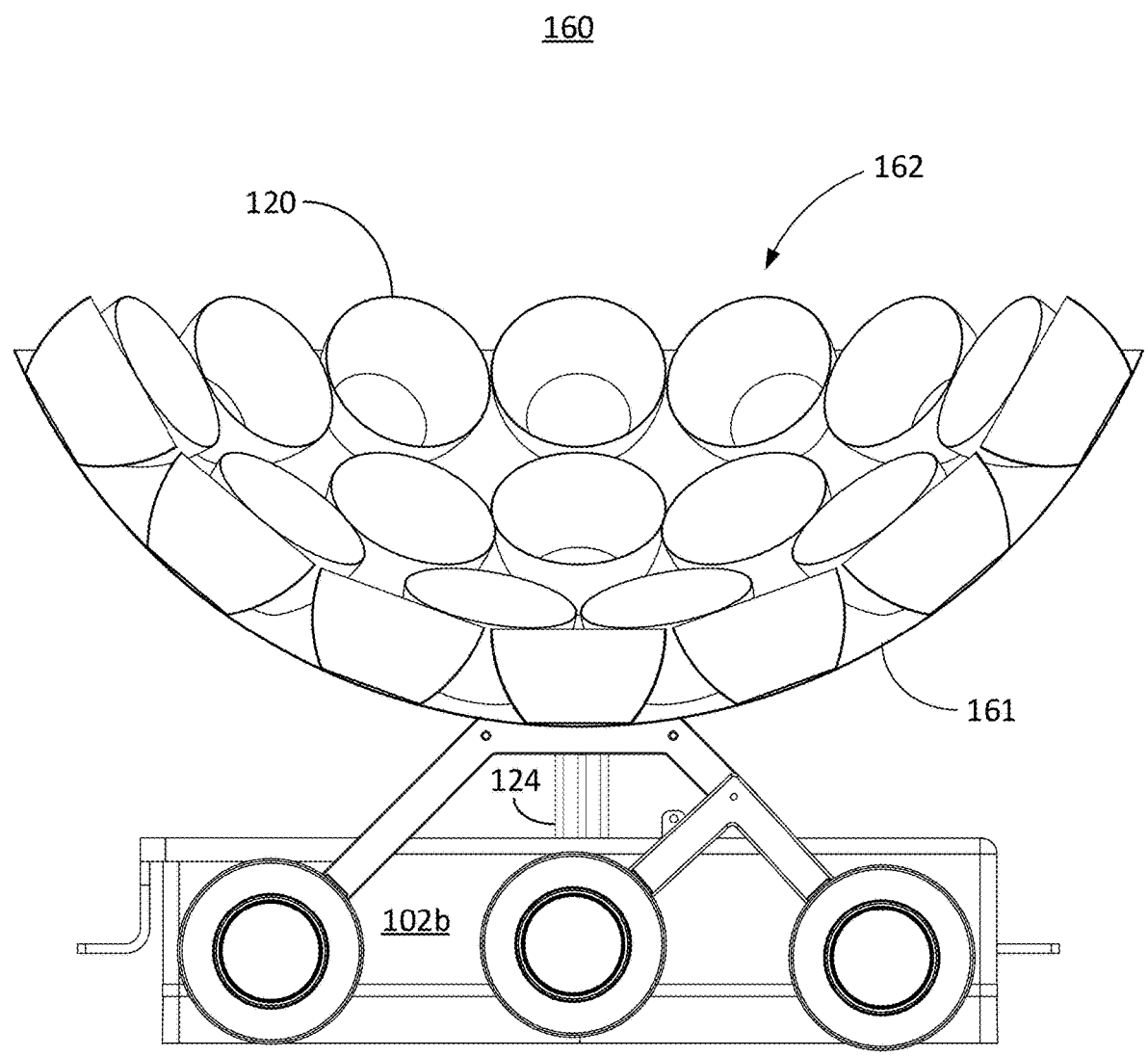
FIG. 3B is a line drawing illustratively depicting a cross section of the CPC and gas collection arrangement of FIG. 1C constructed in accordance with embodiments of the present invention.

FIG. 3B is a line drawing illustratively depicting a cross section of the CPC and gas collection arrangement 160 of FIG. 1C constructed in accordance with embodiments of the present invention. As shown, the concave curved CPC array 162 is arched in a concave arrangement. Here, the CPCs 120 are disposed along a concave semi-spherical frame 161, which is adapted and arranged as an armature to support the plurality of CPCs 120. The concave curved CPC array 162 can be static or optionally dynamically moved to follow the sun 140 as depicted in FIGS. 2C and 2D.

Figure 3C:
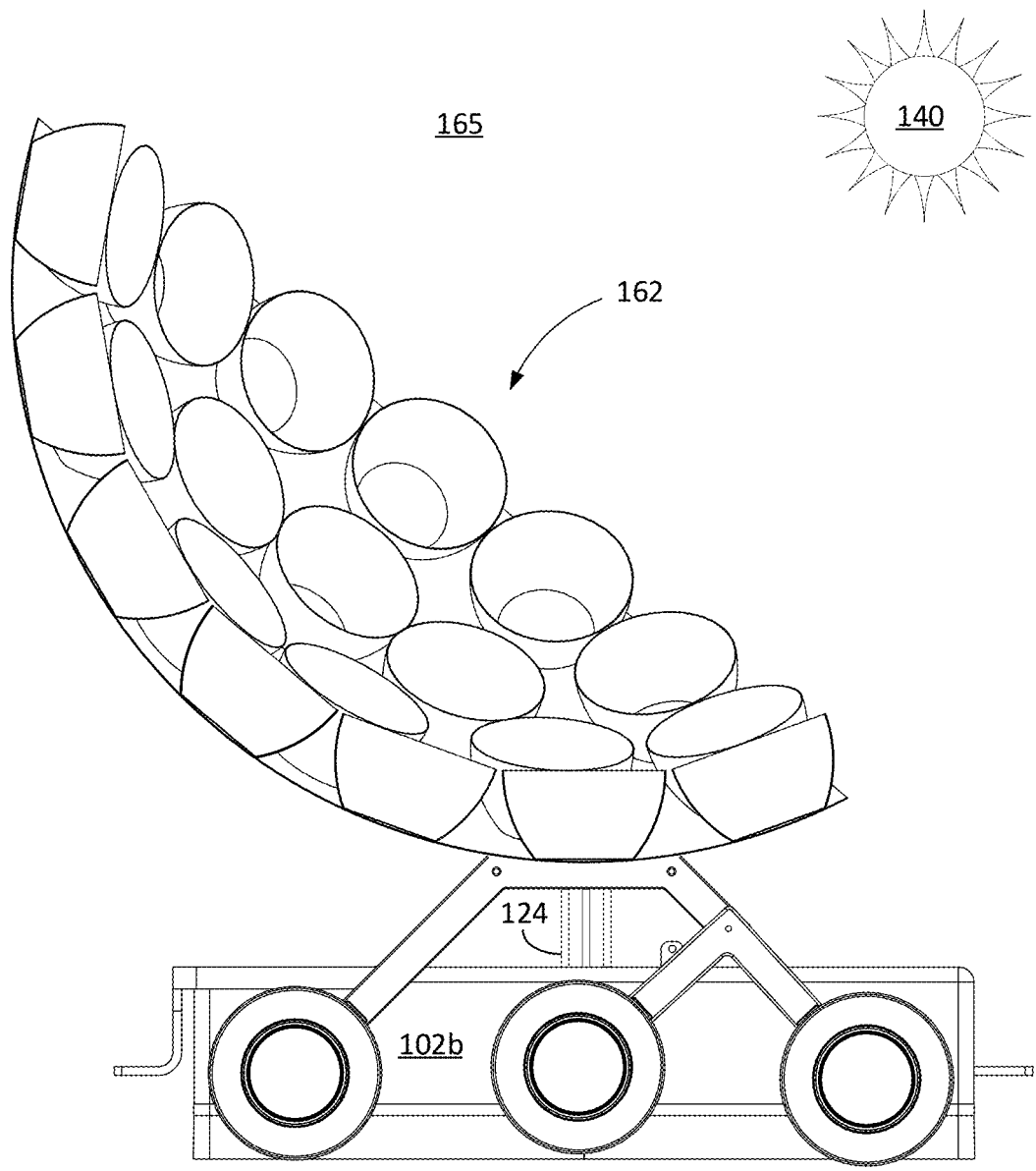
FIGS. 3C and 3D are line drawings illustratively depicting cross-sections of an embodiment of a motorized convex CPC arrangement in two different positions on a wagon consistent with embodiments of the present invention.
Figure 3D:
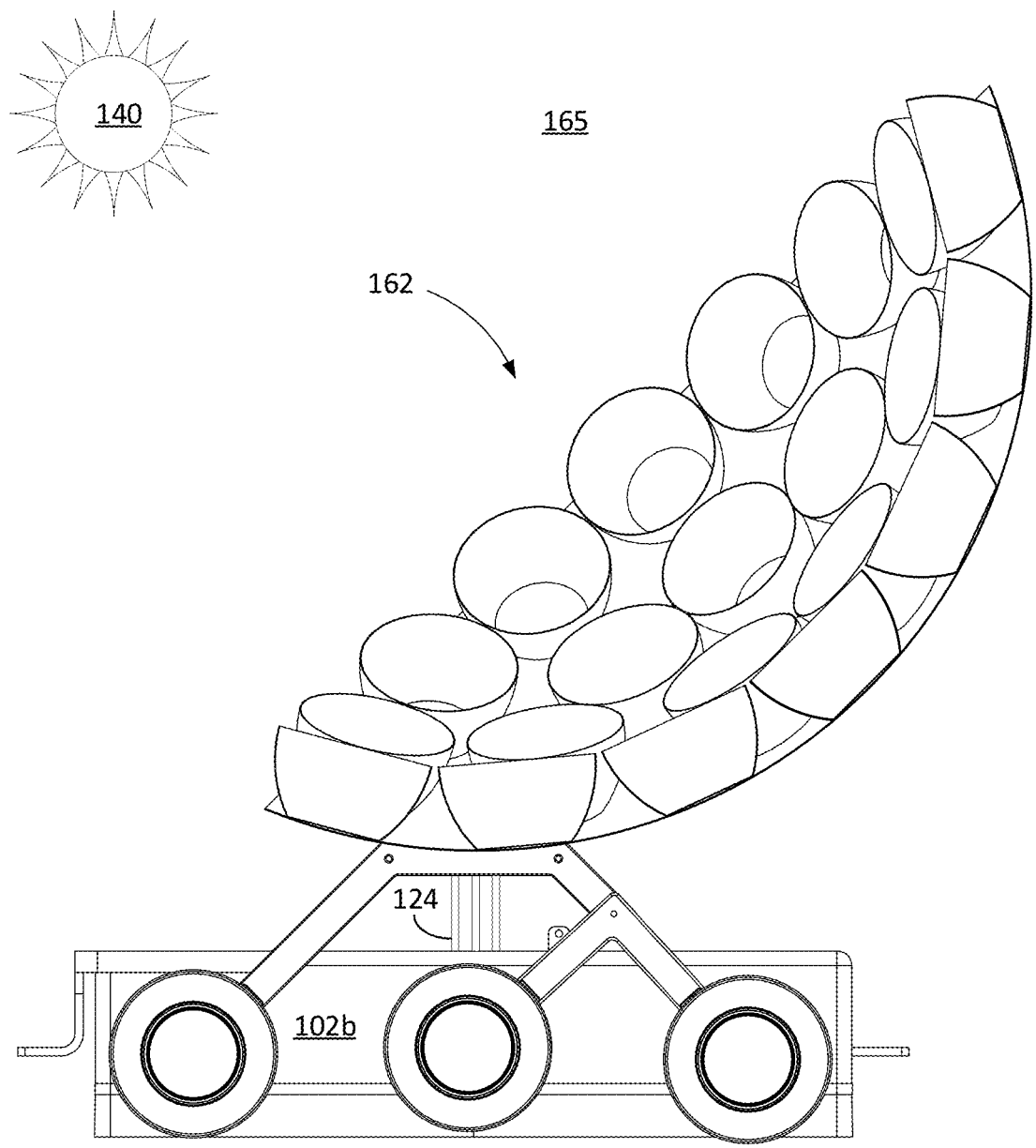

FIGS. 3C and 3D are line drawings illustratively depicting cross-sections of an embodiment of a motorized convex CPC arrangement 165 in two different positions on a wagon 102b consistent with embodiments of the present invention. As shown in FIG. 3C the concave curved CPC array 162 is angled to more efficiently collect solar energy from the sun 140 when the sun 140 is behind the wagon 102b, or when the sun 140 is in front of the wagon 102b, as shown in FIG. 2D. The concave curved CPC array 162 can be moved by a motor (not shown) from the direction depicted in FIG. 3C to that of FIG. 3D.

Figure 3E:
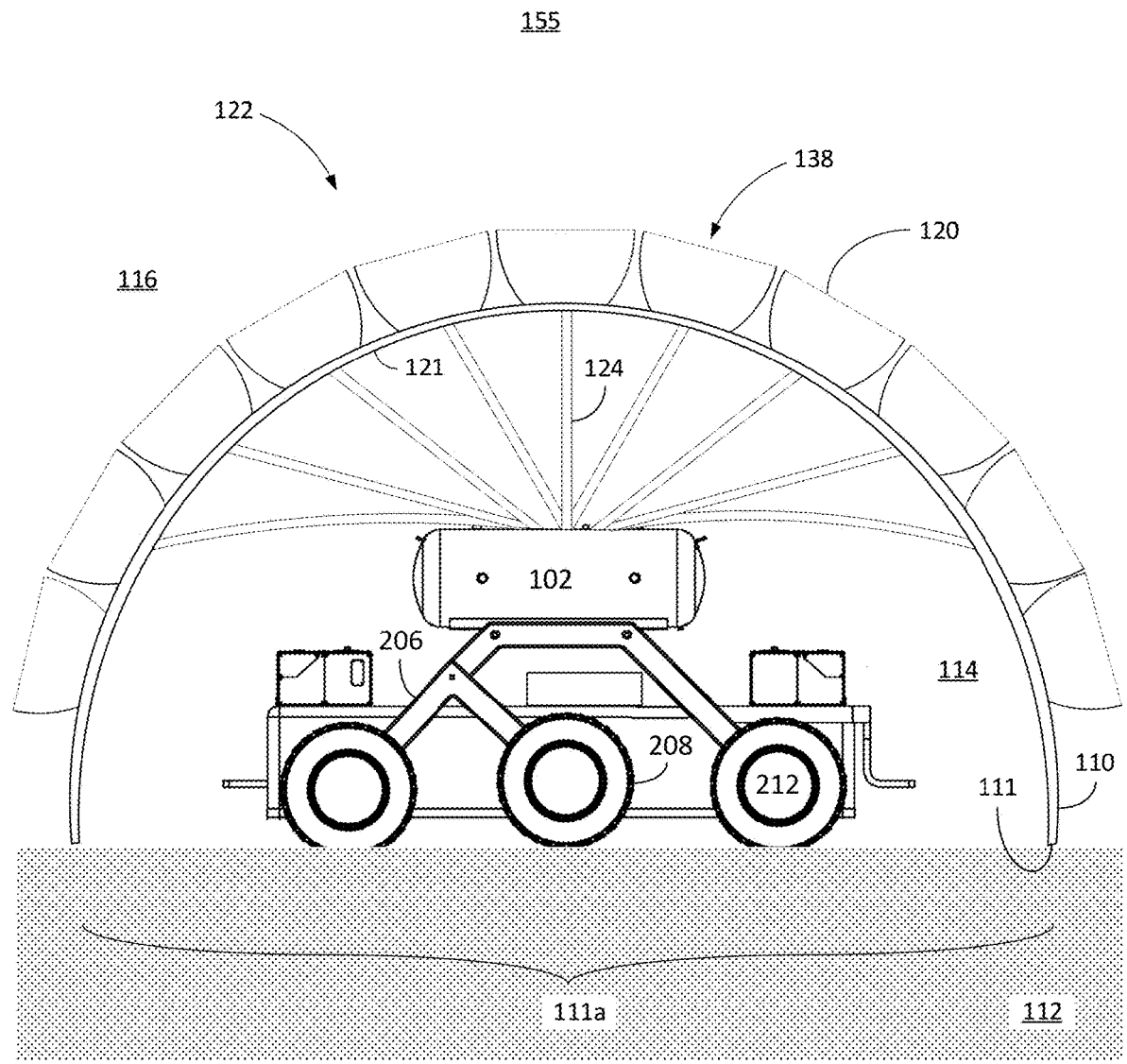
FIG. 3E is a line drawing illustratively depicting a side view of another CPC and gas collection arrangement with a convex array doubling as a cover consistent with embodiments of the present invention FIG. 4A, in view of FIG. 4B, is a line drawing of an isometric view of a CPC and fiberoptic cable arrangement consistent with embodiments of the present invention.

FIG. 3E is a line drawing illustratively depicting a side view of another CPC and gas collection arrangement with a convex array doubling as a cover consistent with embodiments of the present invention. Here, the convex frame 121 functions as the cover 110 with a cover rim 111 that is configured to move towards (and away from) the regolith 112 until it seals against the regolith 112 thereby creating an internal environment 114 that is not in fluid communication with the exterior environment 116 because the regolith 112 is blocking the fluid communication wherein fluid can pass through freely. Accordingly, many of the other attributes in the previous embodiments can be superimposed or otherwise implemented in the embodiment of FIG. 3E without departing from the scope and spirit of the present invention.

FIG. 4A, in view of FIG. 4B, is a line drawing of an isometric view of a CPC 120 and fiberoptic cable 124 arrangement consistent with embodiments of the present invention. As shown, in this configuration, the CPC 120 comprises a concave reflective bowl 130 that is defined between a bowl rim 134 and a bowl apex 136. The concave reflective bowl 130 is configured to receive sunlight through a CPC inlet aperture 138 defined by the bowl rim 134, wherein sunlight 140 is reflected to the bowl apex 136 at the bowl apex 136 via the reflective parabolically shaped inner surface 132. The parabolically shaped inner surface 132 is defined by a 2-D parabola that is rotated in 3-D along the parabola base, or vertex. Certain embodiments envision the concave reflective bowl 130 comprising a reflective inner surface 132 with a refractive index of at least 1.4, which in some embodiments is a mirror. Here, the bowl interior 135 is parabolically shaped to best direct (reflect) the sunlight in a concentrated form to the bowl apex 136 where a light concentrator lens 129 further concentrates the light, which is transmitted to the fiberoptic inlet end 128. The fiberoptic inlet end 128 comprises a fiberoptic inlet end 128 (also referred to as a light pipe aperture) that receives the concentrated sunlight 143a and transmits down the length of the fiberoptic cable 124. The fiberoptic cable 124 channels concentrated light 143a to a fiberoptic outlet end 126 where the concentrated light 143a can be emitted as a further concentrated beam of light 143b.

FIG. 4B is a line drawing of a CPC cross-section depicting soler energy concentration consistent with embodiments of the present invention. The cross-section of the CPC 120 depicts the solar energy 142 from the sun 140 being received through the collector opening/orifice 138 and reflected off the reflective sides 132 to the light concentrator lens 129 at the bowl apex 136. An aperture in the bowl apex 137 directs the solar energy 142 reflected from the bowl inner sides 132 to the light concentrator lens 129, which further concentrates the light 143a to the fiberoptic inlet end 128. The acceptance angle 20° 146 of the concave reflective bowl 130 is defined by the diameter of the bowl rim 134. This determines how much solar energy 140 can be collected, as depicted by the limits of light diameter points 142a and 142b. The parabolic shape of the concave reflective bowl 130 is curved to direct and concentrate essentially all the solar energy 142 to the light concentrator lens 129, as depicted by the reflected angle of the sun's light 142 bouncing off the reflective inner surface 132. As mentioned, the light concentrator lens 129 focuses the light received from the bowl apex 136 into a further concentrated light 143a that is channeled into the fiberoptic inlet end 128. The concentrated light 143a bounces off the inner surface of the fiberoptic cable 124 through the fiberoptic outlet end 126 where it is emitted. In this embodiment, there is a secondary concentration lens 133 at the fiberoptic outlet end 126, which focuses the concentrated light 143a into a high heat light concentrated beam 143b having a focal point on the regolith 112. The secondary concentration lens 133 can include a collimating lens, or lens portion, at the fiberoptic outlet end 126, which causes the emitted light 143b to be parallel followed by a focusing lens, which causes the parallel light to converge on a focal point. The regolith 112 is heated by the high heat light concentrated beam 143b, which releases gaseous elements and molecules (gaseous material) from the regolith 112 in the heated region 144, as shown. The released or otherwise liberated gaseous material migrates into the shielded environment 114 where it is condensed on the gas condensation plates 115 for harvesting.

FIG. 4C is a line drawing of a compound parabolic concentrator array cross-section in a convex arrangement 100 consistent with embodiments of the present invention. As shown, there are a plurality of CPCs 120 that are distributed along a convex arch, wherein three of the CPCs 120 are positioned to receive sunlight 142 from the sun 140 via their respective CPC inlet apertures 138. The left two CPCs 120 are not positioned to receive sunlight 142 from the sun 140 based on the angle of the sun 140. The three CPCs 120 to the right capture and direct the sunlight 140 to the bowl apex 136 where the sunlight 142 is concentrated via the light concentrator lens 129. The concentrated light 143a is piped down to the fiberoptic outlet end 126 where it is emitted as a high heat light concentrated beam 143b at the three far right fiberoptic outlet ends 126. The high heat light concentrated beam 143b heats a region 144 of the regolith 112 at sufficient heat to release the gaseous materials trapped in the regolith 112. In some embodiments, the region 144 is heated to a temperature that is between 600° C.-1000° C.

Certain embodiments envision the fiberoptic outlet ends 126 being arranged in a line or several lines to heat the regolith 112 in a select region under the high heat light concentrated beams 143b. One method envisions the rover 102 being stationary with the cover rim 111 on the surface 112a for enough time for the gas to be liberated from the regolith 112 and collected on the gas condensation plates 115. The cover rim 111 is then retracted 119 allowing the wagon 102b to be pulled to a new location to mine fresh regolith 112. An optional embodiment envisions the fiberoptic outlet ends 126 being actuated by a motor (not shown) to sweep over a larger area of the regolith 112 reducing the amount of raising and lowering the cover rim 111. Another embodiment envisions the cover rim 111 being a sled that does not need to be raised and lowered, wherein the rover 102 is in constant forward motion with the high heat light concentrated beams 143b sweeping continuously over the regolith 112.

Certain embodiments envision a method wherein a CPC and gas collection arrangement comprises an array of CPCs 120 arranged to confront the sun 140 in a manner that essentially permits all or the majority of the CPCs 120 to collect sunlight 142. For example, consider the CPC and gas collection arrangement 150 of FIG. 1B, which comprises a half semi-spherical convex CPC array 122b disposed on a wagon 102b. Due to its mobility, the wagon 102b can be positioned with the CPCs 120 essentially optimally pointing towards the sun 140. In one method embodiment, shown in FIG. 1B, the CPC and gas collection arrangement 150 is pointed in the east towards the rising sun 140 with the rover 102 traversing the moon 141 in western direction, thereby harvesting gases from the regolith 112 as the wagon 102b sweeps across the surface 112a. The CPC and gas collection arrangement 150 is then turned around with the CPC array 122b pointing in the west towards the setting sun 140 with the rover 102 traversing the moon 141 in an eastern direction. Because the sun 140 takes approximately 2 weeks to traverse the lunar sky, the CPC and gas collection arrangement 150 can be employed to mine the moon 141 in one direction for the first week and the other direction for the second week of a solar-lunar cycle.

Figure 5A:
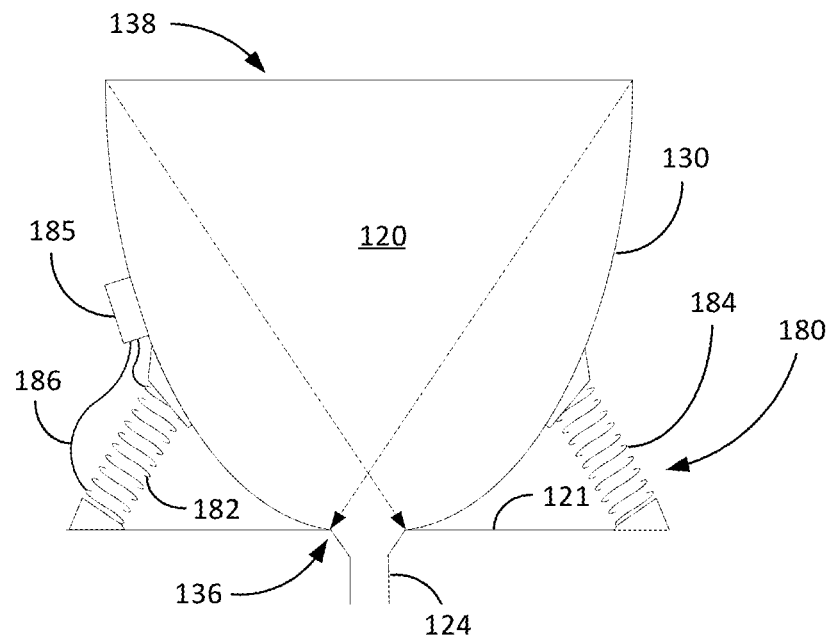
FIGS. 5A and 5B are line drawings illustratively depicting a redirecting spring and nitinol deflector consistent with embodiments of the present invention.
Figure 5B:
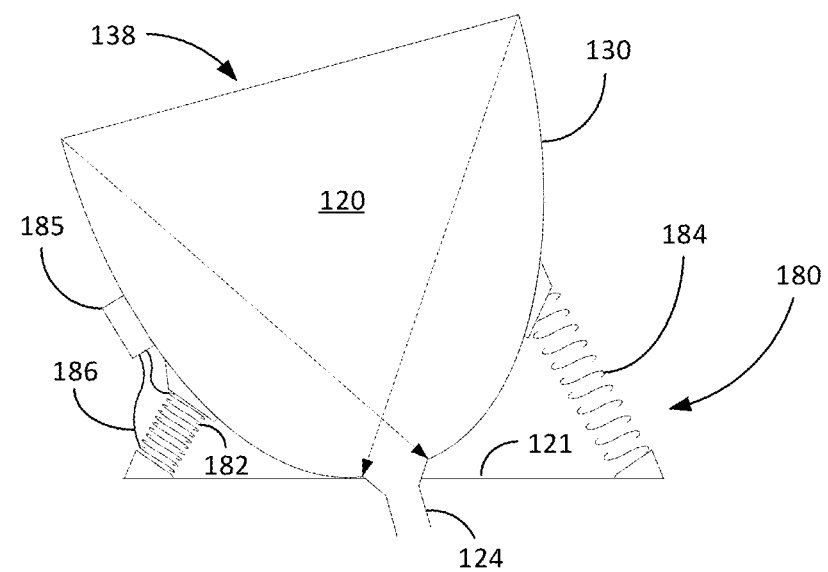

FIGS. 5A and 5B are line drawings illustratively depicting a redirecting spring and nitinol deflector 180 consistent with embodiments of the present invention. As shown, at least one of the plurality of CPCs 120 is connected to a redirecting spring and nitinol deflector 180 that is configured to move at least one CPC 120 towards the sun 140 as it traverses above the wagon 102b. The outside of the concave reflective bowl 130 is connected to the frame 121 via a nitinol coil 182 on the left side of the bowl 130 and a standard spring 184 (such as a steel spring or titanium spring, etc.) on the right side of the bowl 130. A voltage source 185 is electrically connected to the ends of the nitinol coil 182 via electrical transmission lines 186. Nitinol is a shape memory alloy wherein a nitinol structure, such as the nitinol coil 182, is formed or otherwise set into the compressed coil shape at a temperature around 500° C. In a relaxed state, the coil may be stretched with little resistance but when reheated to its transition temperature, which can be as low as 40° C., the nitinol coil 182 will return to its set coil shape.

As shown in FIG. 5A, the nitinol coil 182 is in a relaxed state wherein the spring 184 comprises enough force to pull the CPC 120 in a first position, which in this embodiment is when the CPC inlet aperture 138 is facing upwards. While in the relaxed state, the voltage source 185 is not providing any current to the nitinol coil 182.

As shown in FIG. 5B, the nitinol coil 182 is compressed in its memory set state, which is accomplished by heats the nitinol coil 182 above its transition temperature with current supplied to the ends of the nitinol coil 182 via the electrical transmission lines 186. The heated nitinol coil 182 is stronger than (i.e., overcomes) the spring force of the spring 184 thereby pivoting the CPC 120 at the bowl apex 136 into a second position tipping the CPC inlet aperture 138 to the left. In this way, the CPC can be made to better confront the sun 140 thereby improving the solar energy collection to generate heat from the sunlight transmission down the fiberoptic cable 124.

The redirecting spring and nitinol deflector 180 is one embodiment of a CPC deflector arrangement, which could be accomplished by a hydraulic piston arrangement or motor and linkage assembly to move the CPC 120 to track the sun 140. One advantage that the redirecting spring and nitinol deflector 180 has over these other optional embodiments is that the nitinol and spring have no friction interfacing surfaces, which might wear due to the abrasive nature of regolith dust.

With the present description in mind, below are some examples of certain embodiments illustratively complementing some of the apparatus embodiments discussed above and presented in the figures to aid the reader. Accordingly, the elements called out below are provided by example to aid in the understanding of the present invention and should not be considered limiting. The reader will appreciate that the below elements and configurations can be interchangeable within the scope and spirit of the present invention. The illustrative embodiments can include elements from the figures.

In that light, certain embodiments of the present invention envision a CPC heating arrangement 100 that generally comprises a transporter 102a that carries a plurality of CPCs 120 that are equipped to heat granular soil 112 to mine target gases trapped in the granular soil 112, a depicted largely in FIG. 3A. More specifically, the transporter 102a comprises a transporter body 109 defining a top end 107 and a bottom end 101, wherein the bottom end 101 is configured to interface a surface 112A of an extra-terrestrial body 141. The transporter 102a is configured to be moved in different locations on the extra-terrestrial body 190, such as the moon 141. The CPC arrangement further comprises a cover 110 having an internal cover volume 114, which is a volume within the cover 110 defined from between a cover rim 111 and an inside cover top 107c of the cover 110. The internal cover volume 114 is defined by a shielded environment 114 when the cover rim 111 rests atop granular soil 112. The shielded environment 114 is the internal volume of the cover and is only in communication with an outside environment 116 via the cover rim 111 when the cover rim 111 is not resting atop the granular soil 112. Resting atop means in contact with the granular soil wherein there are essentially no gaps between the granular soil surface 112a and the cover rim 111. Resting can be wherein at least a portion of the weight of the cover 110 is supported by the granular soil 112 or if the cover 110 is pressed into the granular soil 112 via a motorized actuator connected to the transporter 102a. The plurality of CPCs 120 extends from the top end 107, such as an array 122 on an armature or frame 121. Each CPC 120 comprises a concave reflective bowl 130 having a refractive index of at least 1.4. Each of the concave reflective bowls 130 are defined between a bowl rim 134 and a bowl apex 136, wherein the bowl rim 134 is configured to confront the sun 140 and the bowl apex 136 (an aperture located at the bowl apex 136) is configured to receive sunlight 142 from the concave reflective bowl 134. Each of the concave reflective bowls 130 further comprises a fiberoptic cable 124 extending from a fiberoptic inlet end 128 connected to the bowl apex 136 to a fiberoptic outlet end 126 located in the internal volume 114. The fiberoptic outlet end 126 is configured to reside within 6 inches from the granular soil 112. The sunlight 142 is configured to be received at the fiberoptic inlet end 128 and emitted at the fiberoptic outlet end 126.

Another embodiment of the present invention contemplates a CPC arrangement 100 generally comprising a transporter 102a, an internal cover volume 114 and a cryogenically cooled condensation surface 115. The transporter 102a supports a plurality of CPCs 120 each configured to receive sunlight. Each CPC 120 comprises a concave reflective bowl 130 defined between a bowl rim 134 and a bowl apex 136 comprising a bowl aperture and a fiberoptic cable extending from a fiberoptic inlet end 128 at the apex 136 to a fiberoptic outlet end 126. The fiberoptic outlet end 126 is configured to emit the sunlight, that is received at the fiberoptic inlet end 128 from the bowl aperture, on a granular surface 112. The CPC arrangement 100 further comprises an internal cover volume 114 defined within a cover 110 that extends from an internal cover top 107c to a cover rim 111. There is a cryogenically cooled surface 115 within the internal cover volume 114, wherein the cryogenically cooled surface 115 configured to be cooled by cryogenic liquid. The fiberoptic outlet end 126 extends into the internal cover volume 114.

The CPC arrangement 100 further envisions the cover 110 being connected to the transporter 102a.

The CPC arrangement 100 further imagines the transporter 102a being a rover 102.

The CPC arrangement 100 further contemplates the plurality of CPCs 120 being arranged in a semi-sphere on at least one side of the transporter 102a.

The CPC arrangement 100 further considers the plurality of CPCs 120 being arranged in a convex array 122 on at least one side of the transporter 102a. Here, the convex array 122 can optionally be bowl-shaped 162.

The CPC arrangement 100 further envisions each of the concave reflective bowls 130 being parabolic-shaped.

The CPC arrangement 100 contemplates at least one of the plurality of concave reflective bowls 130 being connected to a redirector, such as a redirecting spring and nitinol deflector arrangement 180, that is configured to move the at least one concave reflective bowls 130 to better confront the sun 140 as it traverses above the transporter 102a. The redirector can be a nitinol linkage that moves when heated and cooled, at least one hydraulic lifter, a motor driven linkage that moves each CPC 120, etc.

The CPC arrangement 100 further envisions an embodiment wherein the plurality of concave reflective bowls 130 are statically mounted on the transporter 102a, meaning they cannot be adjusted or moved to track the sun 140, for example.

The CPC arrangement 100 further envisions the transporter 102a being configured to traverse the extra-terrestrial body 141 in a first direction 195 while the sun 140 is in a rising trajectory and the transporter 102a being configured to traverse the extra-terrestrial body 141 in a second direction 196 while the sun 140 is in a setting trajectory.

The CPC arrangement 100 further imagines at least one of the fiberoptic cables 124 being connected to a fiberoptic redirector or motor that is configured to move or bend the at least one fiberoptic cable 124 to shine the sunlight 142 over a region 144 of the granular soil 112.

The CPC arrangement 100 further contemplates the fiberoptic outlet ends 126 being arranged in a line that is configured to traverse the granular soil 112 (like the teeth of a rake) as the transporter 102a traverses the extra-terrestrial body 141.

The CPC arrangement 100 can further comprise a light concentrator lens 129 configured to receive the sunlight 142 at the bowl apex 136 and concentrate the sunlight 142 into concentrated light 143a that is transmitted through the fiberoptic cable 124.

The CPC arrangement 100 can further comprise a secondary concentration lens 133 that is configured to receive the sunlight 142 from the fiberoptic outlet end 126 and concentrate the sunlight 142 into a high heat light concentrated beam 143b that is directed to the granular soil 112.

Yet another embodiment of the present invention contemplates a CPC system 100 that generally comprises a transporter 102a that carries a plurality of CPCs 120 that are equipped to heat regolith 112 to mine target gases trapped in the regolith 112. More specifically, the transporter 102a defines a top end 107 and a bottom end 101 with the bottom end being configured to interface regolith 112. The transporter 102a configured to be moved in different locations on the moon 141. The CPC system 100 further comprises a cover 110 that defines a shielded environment 114 when a cover rim 111 of the cover 110 rests atop the regolith 112. The shielded environment 114 (or the internal cover volume when not in contact with the regolith 112) is only in communication with an outside environment 116 via the cover rim 111 when the cover 110 does not rest atop the regolith 112. The plurality of CPCs 120 extends from the top end 107, wherein each CPC 120 comprises a concave parabolic reflective bowl 130. Each of the concave reflective bowls 130 is defined between a bowl rim 134 and a bowl apex 136, wherein the bowl rim 134 is configured to receive sunlight. An aperture in the bowl apex 136 is configured to receive the sunlight 142 from the concave reflective bowl 134. A fiberoptic cable 124 extends from a fiberoptic inlet end 128 to a fiberoptic outlet end 126 and connects to the bowl apex 136 at the fiberoptic inlet end 128. The fiberoptic cable 124 is in light communication with the aperture, meaning light moves through the aperture and into the fiberoptic cable 124. The fiberoptic outlet end 126 is located in the shielded environment 114 and is configured to interface the regolith 112. The fiberoptic cable 124 is configured to transmit the sunlight 142 from the fiberoptic inlet end 128 through the fiberoptic outlet end 126.

The CPC system 100 further envisions the shielded environment 114 extending from a wagon 102b that is configured to be moved by a rover 102.

The CPC system 100 further imagines the transporter 102a being a rover 102 or a wagon 102b.

The CPC system 100 can further comprise a light concentrator lens 129 that bridges the aperture and the fiberoptic inlet end 128.

The CPC system 100 can further comprise a secondary concentration lens 133 that is configured to focus light from the fiberoptic outlet end 126.

Still, another embodiment of the present invention contemplates a CPC and gas collection arrangement 100 that generally comprises a transporter 102a that carries a plurality of CPCs 122 that are equipped to heat granular soil 112 to mine target gases trapped in the granular soil 112. More specifically, the transporter 102a is configured to be moved in different locations on the moon 141. The arrangement 100 further comprises a cover 110 that defines a shielded environment 114 when a cover rim 111 of the cover 110 rests atop the regolith 112. The shielded environment 114 is not in communication with an outside environment 116. The plurality of CPCs 122, wherein each of the plurality of CPCs 120 comprises a concave parabolic reflective bowl 130 that is defined between a bowl rim 134 and a bowl apex 136. The bowl rim 134 is configured to receive sunlight and direct the sunlight 142 to and aperture at the bowl apex 136.

The arrangement 100 can further comprise a fiberoptic cable 124 that has a fiberoptic inlet end 128 extending from the aperture and a fiberoptic outlet end 126 that extends into the shielded environment 114. The fiberoptic outlet end 126 is configured to interface the regolith 112, wherein the sunlight 142 is configured to be received at the fiberoptic inlet end 128 and emitted at the fiberoptic outlet end 126.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended embodiments are expressed. For example, the orientation of the elements and the plate can include other geometries not explicitly shown in the embodiments above while maintaining essentially the same functionality without departing from the scope and spirit of the present invention. Likewise, the materials and construction of the cooling surfaces can vary but serve the same purpose without departing from the scope and spirit of the present invention. It should further be appreciated that the arrangement of the CPCs 120, the cover, the transporter, and the arrangement of the fiberoptic cables can vary while maintaining the functionality described within the scope and spirit of the present invention. Moreover, the electronics and computing that enable the functionality of the gas collection system are not described in detail because the electronics and computing elements either exist or are easily constructed by those skilled in the art.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A compound parabolic concentrator (CPC) arrangement comprising:
   a transporter supporting a plurality of CPCs each configured to receive sunlight, wherein each CPC comprising:
      a concave reflective bowl defined between a bowl rim and a bowl apex that comprises a bowl aperture;
      a fiberoptic cable extending from a fiberoptic inlet end at the bowl apex to a fiberoptic outlet end, the fiberoptic outlet end configured to emit the sunlight received at the fiberoptic inlet end from the bowl aperture, the sunlight emitted on a granular surface;
   an internal cover volume defined within a cover that extends from an internal cover top to a cover rim;
   a cryogenically cooled surface within the internal cover volume, the cryogenically cooled surface configured to be cooled by cryogenic liquid,
   the fiberoptic outlet end extending into the internal cover volume;
   a light concentrator lens configured to receive the sunlight at the bowl apex and concentrate the sunlight into concentrated light that is transmitted through the fiberoptic cable.

2. The compound parabolic concentrator arrangement of claim 1, wherein the cover is connected to the transporter.

3. The compound parabolic concentrator arrangement of claim 1, wherein the transporter is a rover.

4. The compound parabolic concentrator arrangement of claim 1, wherein the plurality of CPCs is arranged in a semi-sphere on at least one side of the transporter.

5. The compound parabolic concentrator arrangement of claim 1, wherein the plurality of CPCs is arranged in a convex array on at least one side of the transporter.

6. The compound parabolic concentrator arrangement of claim 5, wherein the convex array is bowl-shaped.

7. The compound parabolic concentrator arrangement of claim 1, wherein each of the concave reflective bowls is parabolic-shaped.

8. The compound parabolic concentrator arrangement of claim 1, wherein at least one of the plurality of CPCs is connected to a redirecting spring and nitinol deflector that is configured to move the at least one concave reflective bowls towards the sun as it traverses above the transporter.

9. The compound parabolic concentrator arrangement of claim 1, wherein the plurality of concave reflective bowls is statically mounted on the transporter.

10. The compound parabolic concentrator arrangement of claim 1, wherein the transporter is configured to traverse the extra-terrestrial body in a first direction while the sun is in a rising trajectory and the transporter is configured to traverse the extra-terrestrial body in a second direction while the sun is in a setting trajectory.

11. The compound parabolic concentrator arrangement of claim 1 further comprising a secondary concentration lens that is configured to receive the sunlight from the fiberoptic outlet end and concentrate the sunlight into a high heat light concentrated beam that is directed to the granular soil.

12. A compound parabolic concentrator (CPC) system comprising:
a transporter defining a top end and a bottom end that is configured to interface regolith, the transporter configured to be moved in different locations on the moon;
a cover defining an internal cover environment which is a volume within the cover defined between a cover rim and an inside cover top of the cover;
a plurality of CPCs extending from the top end, wherein each CPC comprises a concave parabolic reflective bowl;
each of the concave reflective bowls defined between a bowl rim and a bowl apex, wherein the bowl rim is configured to receive sunlight from the sun and an aperture in the bowl apex is configured to receive the sunlight reflected from the concave reflective bowl;
a fiberoptic cable extending from a fiberoptic inlet end to a fiberoptic outlet end,
the fiberoptic inlet end connected to the bowl apex and in communication with the aperture, the fiberoptic outlet end located in the internal cover volume, the fiberoptic outlet end configured to interface the regolith, the fiberoptic cable configured to transmit the sunlight from the fiberoptic inlet end through the fiberoptic outlet end; and
a light concentrator lens that bridges the aperture and the fiberoptic inlet end.

13. The CPC system of claim 12, wherein at least one of the plurality of concave reflective bowls is connected to a redirector that is configured to move the at least one concave reflective bowls to better confront the sun as it traverses above the transporter.

14. The CPC system of claim 12, wherein the internal cover volume extends from a wagon configured to be moved by a rover.

15. The CPC system of claim 12 further comprising a cryogenically cooled surface inside of the internal cover environment.

16. The CPC system of claim 12 further comprising a secondary concentration lens that is configured to focus light from the fiberoptic outlet end.

17. A CPC arrangement comprising:
a plurality of CPCs mounted atop an extra-terrestrial transporter, each of the plurality of CPCs comprising:
a concave reflective bowl defined between a bowl rim and a bowl apex, the concave reflective bowl configured to receive sunlight via the bowl rim and redirect the sunlight to an aperture in the bowl apex;
a fiberoptic cable comprising an inlet end connected to the aperture and an outlet end that extends into an internal cover volume defined within a cover,
the cover extending from a cover top to a cover rim, the cover rim configured to press against a regolith surface,
the internal cover volume is defined between a cover rim and an inside cover top of the cover, the internal cover volume is not in communication with an outside environment when pressed against the regolith surface; and
a light concentrator lens that bridges the aperture and the fiberoptic inlet end.

18. The CPC arrangement of claim 17 further comprising a cryogenically cooled surface inside of the internal cover volume.

* * * * *